Patented July 21, 1925.

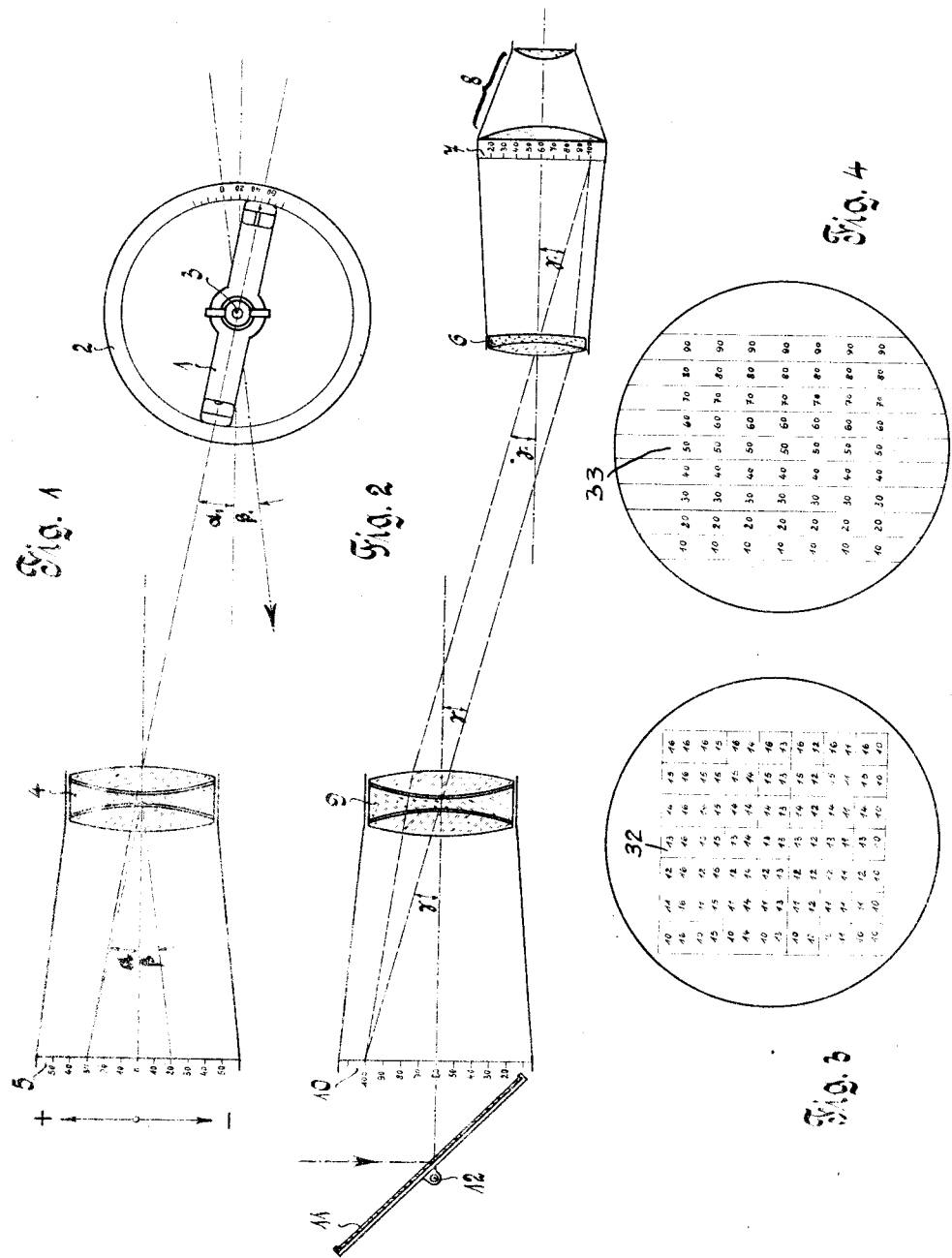

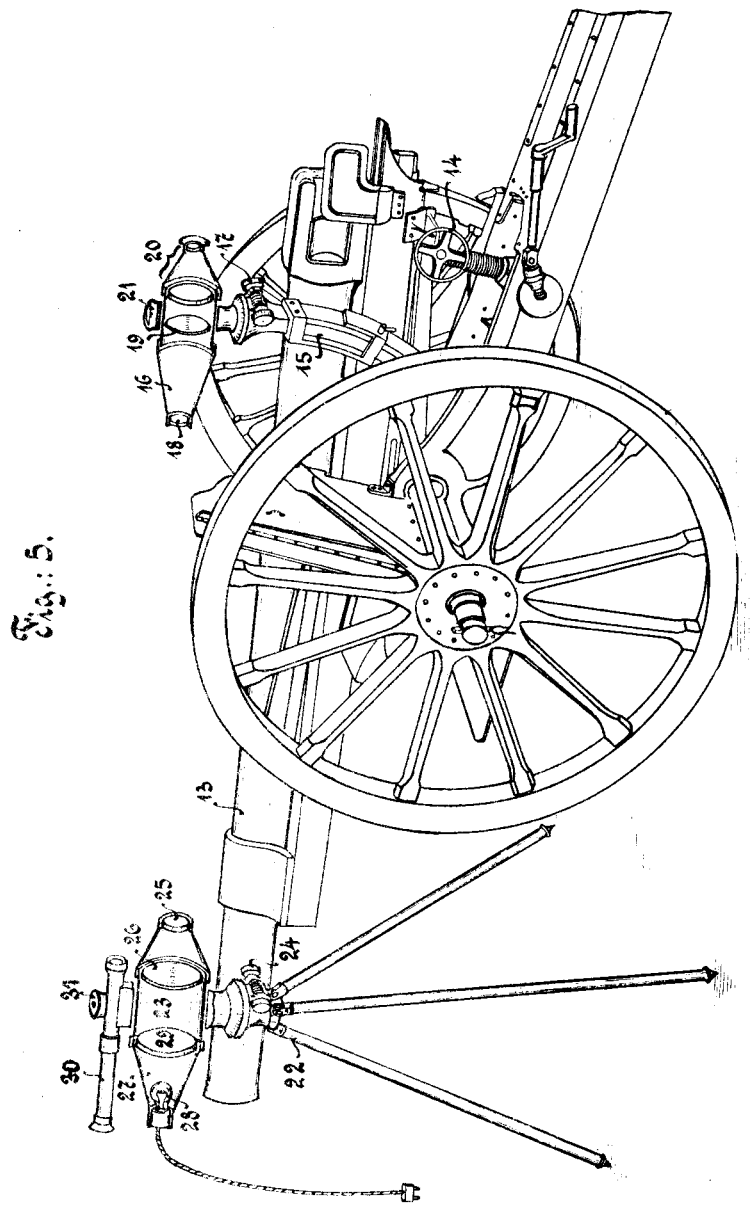

1,546,687

UNITED STATES PATENT OFFICE.

RUDOLF STÜTZER, OF WETZLAR, GERMANY.

DIRECTION FINDING.

Application filed November 20, 1923. Serial No. 675,953.

*To all whom it may concern:*

Be it known that I, RUDOLF STÜTZER, a citizen of the Republic of Germany, residing at Wetzlar, Germany, have invented Improvements in Direction Finding (for which I have filed an application in Germany, November 27, 1922), of which the following is a specification.

My invention relates to a method and apparatus for direction finding whereby a sighting device or the like or an object connected thereto can be adjusted into a desired direction irrespective of its position or can have its direction maintained independently of its motion.

The object of the invention is generally to provide a method and apparatus for carrying out this method whereby certain errors which otherwise tend to arise can be obviated.

A further object of the invention is a method of directing a sighting device or the like or an object connected thereto according to which the sighting device or the like is trained on a condensing optical system disposed at a suitable distance therefrom and provided with a measuring screen or scale, by means of which the direction of the sighting device or of the object connected thereto can be determined or adjusted. For this purpose the condensing optical system is mounted on a stationary bearer. The measuring screen or scale which may be graduated in degrees or in other ways, is preferably disposed in the focal plane of the condensing optical system, and its graduation is produced over a considerable portion of the field of view of the condensing optical system.

In one convenient construction the sighting device is in the form of a telescope also provided with a scale or measuring screen preferably in the focal plane of its objective, the graduations of this screen corresponding to those of the screen provided for the lens system. If the telescope objective has the same focal length as the condensing lens system, the graduations of the two screens will be similar but arranged in opposite senses. They may on the other hand be arranged in the same sense, if desired, but in this case prisms or other suitable devices must be interposed to effect a reversal of the image. If the two focal lengths are not the same, similarly marked graduations on the two screens must be disposed in corresponding angular positions.

Generally the relation between the graduations of the screen connected to the telescope objective and the graduations connected to the condensing system correspond to the relation between the respective focal lengths of both systems, according to the following formulæ. Screen of the condensing system: screen of the telescopic objective = focal length of the condensing system: focal length of the telescopic objective, or screen of the condensing system: focal length of the condensing system = screen of the telescopic objective: focal length of the telescopic objective.

If the sighting device provided with a graduated circle instead of a screen, the screen of the condensing system is so related to the focal length of the same system that the graduations of the screen correspond to those of the graduated circle; f. i. both scales are graduated in values of angles. Generally equally marked graduations on both scales should correspond to the same values of angles.—

If, as is often the case, it is only necessary to define the direction in one plane, for example a horizontal plane, it is desirable that the graduations on the measuring screen of the condensing optical system should be visible at different heights, and to this end the graduation lines are produced over a considerable portion of the field of view, the graduation markings being repeated several times along the lines.

If it is required to define the direction in two planes, e. g. horizontal and vertical, instead of one plane, the screen must be provided with both horizontal and vertical graduation lines.

Preferably the graduation of the condensing lens system extends over a considerable portion over a considerable field of view so that comparatively large movements of the sighting device can be allowed for. If very large movements are likely to occur, the measuring screen would have to be made inconveniently large. To get over this difficulty, the condensing lens system together with its measuring screen may be made rotatable on its bearer. In this case it is preferable to make the sighting device rotatable also. If only one of the two is rotated, the amount of the rotation must be allowed for in the reading. If on the other hand both are rotated through the same angle, no correction will be necessary in the readings. In this manner it is possible to operate through a very wide range of angle, when only a small measuring screen is employed.

It will generally be convenient to employ for the condensing lens system an objective, such for example as a photographic objective, which provides for a large field of view. On the other hand a smaller range of angle will often have to be employed for the sighting telescope, owing to the use of an eyepiece. In this case it will not always be convenient or possible so to adjust the apparatus that a graduation on the measuring screen of the condensing lens system will be covered by the corresponding graduation on the measuring screen of the telescope. This difficulty may be overcome by initially adjusting the apparatus so that one graduation of the screen connected to the condensing lens system (say 80) is covered by any graduation of the telescope screen (say 40). The difference (80 − 40 = 40) between these two readings must then be taken into account in subsequent readjustments of the apparatus.

By day the measuring screen of the condensing lens system may be lighted by means of a mirror and at night from a suitable source, the rays sent out from this screen being utilized to light the measuring screen in the telescope.

A telescope-sight is preferably connected to the condensing lens system for better adjusting it into the desired direction.

It will be seen that the method according to this invention has particular advantages, in its application to indirect gun-fire, where under existing conditions an auxiliary target or aiming point disposed at fairly close range must be used, with the consequent errors due to the displacement of the gun after each shot.

With these general statements of the objects and purposes of my invention I will now proceed to describe the embodiments thereof and the manner in which my invention is carried out, and it will be understood that while I have described what may be considered as a preferable embodiment of my invention, I do not limit myself to the precise conditions or proportions herein set forth, as they may be varied by those skilled in the art in accordance with the particular purposes for which they are intended, and the conditions under which they are to be utilized.

Figure 1 is a section through an improved apparatus, the sighting device being provided with a graduated circle.

Figure 2 is a section through another improved apparatus, the sighting telescope being provided with a graduated screen.

Figure 3 shows a graduated screen for measurements in two planes.

Figure 4 shows a preferred form of a graduated screen.

Figure 5 is an elevation of an improved apparatus used in combination with a gun by indirect firing.

In the construction of Figure 1 the sighting device 1 which is shown as consisting of a fore sight and a back sight, is mounted on a circular scale 2 so as to be rotatable about an axis 3. The circular scale 2 may be formed of or mounted on the instrument to be adjusted. At a suitable distance from the sighting device 1 is disposed an objective 4 consisting of three lenses, in the focal plane of which is arranged a scale or measuring screen 5. It is assumed that the direction of the instrument to be adjusted is given by a line passing through the zero point of the scale 2 and the pivot point 3 (as shown by the arrow).

Figure 1 shows the apparatus after the circular scale 2 has moved for any reason, the various parts having been adjusted so that the circular scale 2 is again trained in the correct direction. The original position was such that when the sighting device 1 was trained on the objective 4 it pointed to the graduation, say, −20 on the screen 5, this reading corresponding to an angle β, the inclination of the zero direction of the scale 2 to the optical axis of the objective 4. It is desired to train the circular scale 2 into this direction, so that the zero direction of the scale 2 again has an inclination to the optical axis of the objective 4.

When it is again desired to adjust the instrument 2 into the correct direction in its new position, the sighting device 1 is trained on the objective 4 and points to the graduation, say +30 of the measuring screen 5, this graduation marking corresponding to an inclination α to the optical axis of the objective 4. The difference between the readings of the two graduations is now worked out +30−(−20)=+50 and the circular scale 2 is adjusted to the graduation thus obtained (in this case +50). The zero direction of the circular scale 2 is now again parallel to its original direction and makes an angle β₁ with the optical axis of the objective 4, whilst the sighting device 1 makes an angle α₁ with this optical axis.

Figure 2 shows another construction in which a telescope is employed as sighting device. In the focal plane of an objective 6 of the telescope is disposed a measuring screen 7 which can be observed by means of an eye-piece 8. At a suitable distance from the objective 6 is an objective 9 consisting of three lenses and having a measuring screen 10 disposed in its focal plane. The two measuring screens 7 and 10 are so graduated that similarly numbered graduations correspond to equal angular positions. The graduations of the two screens must however be numbered in opposite senses, unless suitable means are provided between the two objectives for reversing the image. The measuring screen 10 may be illuminated by means of mirror 11 rotatable about an axis 12.

With this arrangement it will be clear that the optical axes of the two objectives 6 and 9 will be parallel if those portions of the rays from a graduation line on the screen 10, which lie between the objectives 6 and 9 make equal angles $\gamma$ and $\gamma_1$ respectively with the two optical axes. These angles will however be equal when the rays from a graduation line on the screen 10 pass through the similarly numbered line on the telescope screen 7.

With this arrangement the condensing lens system 9 is so arranged that when the telescope is adjusted into the desired direction, a graduation on the screen 10 is covered by the similarly numbered graduation on the telescope screen 7. If now the telescope is moved and it is desired to know whether it is still to be trained in the correct direction, it is necessary to determine whether, when the telescope is trained on to the lens system 9 a graduation of the screen 10 (which need not be identical with the graduation previously chosen) is covered by the corresponding graduation of the telescope screen 7. If this is the case, the telescope is still trained into the right direction. Otherwise it must be adjusted by suitable means until such an agreement is obtained.

Figure 4 shows a suitable arrangement of measuring screen or scale. It will be seen that the graduation lines of the screen 33 are right across the screen and the markings are repeated several times along each line.

If it is required to define the direction in two planes, e. g., horizontal and vertical, instead of one plane, the screen must be provided with both horizontal and vertical graduation lines. In Figure 3 such a screen is illustrated and marked by 32.

The graduation preferably extends over a considerable field of view so that comparatively large movements of the sighting device can be allowed for. If very large movements are likely to occur, the measuring screen would have to be made inconveniently large. To get over this difficulty, the condensing lens system together with its measuring screen may be made rotatable. In this case it is preferable to make the sighting device rotatable also. If only one of the two is rotatable, the amount of the rotation must be allowed for in the readings. If on the other hand both are rotated through the same angle, no correction will be necessary in the readings. In this manner it is possible to operate through a very wide range of angle, when only a small measuring screen is employed.

In Figure 5 such an arrangement is illustrated in combination with a gun. Referring to this figure a gun-barrel 13 is provided and suitably mounted so that it can be set up in the desired position by means of a wheel 14. To the gun is attached an adjustable holder 15 which carries a telescope-sight 16. The latter is horizontally rotatable by means of a handle 17 and consists of an objective 18, a measuring screen 19 similar as drawn in Figure 3 or 4, and an eye-piece 20. A level 21 of suitable form is fixed on the upper side of the telescope-sight 16.

Near before or, if desired, behind or aside the gun is placed a tripod-stand 22 carrying a casing 23 which is horizontally rotatable by means of a handle 24. The casing 23 encloses an objective 25, a measuring screen 26 corresponding in its graduation to the screen 19. Behind the screen 26 are arranged in a frame 27 a lamp 28 and a collecting lens 29 for illuminating the screen 26 at night. The frame 27 is changeable, if desired, with a mirror as drawn in Figure 2. On the casing 23 is fixed a telescope sight 30 for better adjusting the objective 25 into the direction of the telescope-sight 16 mounted on the gun. A level 31 is provided on the telescope-sight 30.

The relations between the objective 25 and the telescope-sight 16 are exactly the same as illustrated in Figure 2. By setting a gun as the object said in the description of Figure 2 it is easy to recognize in what manner the displacements of the gun after a shot has been fired may be compensated by employing the method and the apparatus forming the subject of the present invention.

Having thus described my invention, what I claim and desire to secure by Letters Patent is—

1. In apparatus for directing an object irrespective of its position, the combination with a sighting device and means connected to the sighting device for measuring angles, of a condensing optical system disposed at a suitable distance from said object, a screen connected to the condensing system, the graduations of the screen being extended over a considerable portion of the field of view of the condensing system, the focal length of the condensing system being so related to the said screen that the graduations of the latter correspond to those of the said means for measuring angles, and a stationary bearer for the condensing system and its screen.

2. In apparatus for directing an object irrespective of its position, the combination with a sighting device and means connected to the sighting device for measuring angles, of a condensing optical system disposed at a suitable distance from said object, a screen connected to the condensing system, the graduations of the screen being extended over a considerable portion of the field of view of the condensing system, the focal length of the condensing system being so related to the said screen that the graduations of the latter correspond to those of the said means for measuring angles, a source of light mounted behind said screen for illuminating the same, and a stationary bearer for the condensing system and its accessory.

3. In apparatus for directing an object irrespective of its position, the combination with a sighting device and means connected to the sighting device for measuring angles, of a condensing optical system disposed at a suitable distance from said object, a screen connected to the condensing system, the graduations of the screen being extended over a considerable portion of the field of view of the condensing system, the focal length of the condensing system being so related to the said screen that the graduations of the latter correspond to those of the said means for measuring angles, a mirror movably mounted behind said screen for illuminating the same, and a stationary bearer for the condensing system and its accessory.

4. In apparatus for directing an object irrespective of its position, the combination with a sighting device and means connected to the sighting device for measuring angles, of a condensing optical system disposed at a suitable distance from said object, a screen connected to the condensing system, the graduations of the screen being extended over a considerable portion of the field of view of the condensing system, the focal length of the condensing system being so related to the said screen that the graduations of the latter correspond to those of the said means for measuring angles, markings on said graduations, the said markings being repeated several times along the graduations lines, and a stationary bearer for the condensing system and its screen.

5. In apparatus for directing an object irrespective of its position, the combination with a sighting device and means connected to the sighting device for measuring angles, of a condensing optical system disposed at a suitable distance from said object, a screen connected to the condensing system, the graduations of the screen being extended over a considerable portion of the field of view of the condensing system, the focal length of the condensing system being so related to the said screen that the graduations of the latter correspond to those of the said means for measuring angles, a stationary bearer for the condensing system and its screen, and means for rotating the said condensing system together with its screen on the bearer.

6. In apparatus for directing an object irrespective of its position in combination a sighting telescope, means connected to the sighting telescope for measuring angles, a condensing lens system disposed at a suitable distance from said object, a screen connected to the lens system, the graduations of the screen being extended over a considerable portion of the field of view of the lens system, the focal length of the lens system being so related to the said screen that the graduations of the latter correspond to those of said means for measuring angles, and a stationary bearer for the condensing system and its screen.

7. In apparatus for directing an object irrespective of its position in combination a sighting telescope, means connected to the sighting telescope for measuring angles, a condensing lens system disposed at a suitable distance from said object, a screen connected to the lens system, the graduations of the screen being extended over a considerable portion of the field of view of the lens system, the focal length of the lens system being so related to the said screen that the graduations of the latter correspond to those of said means for measuring angles, a stationary bearer for the lens system and its screen, and means for rotating the said lens system together with its screen on the bearer.

8. In apparatus for directing an object irrespective of its position in combination a sighting telescope, an objective in the sighting telescope, a screen placed in the focal plane of said objective, the graduations of the screen being extended over a considerable portion of the field of view of the sighting telescope, a condensing lens system disposed at a suitable distance from said object, a screen connected to the lens system, the graduations of the screen being extended over a considerable portion of the field of view of the lens system, the focal lengths of the telescope-objective and of the lens system being so related to their respective screens that the graduations of both screens correspond to each other, and a stationary bearer for the lens system and its screen.

9. In apparatus for directing an object irrespective of its position in combination a sighting telescope, an objective in the sighting telescope, a screen placed in the focal plane of said objective, the graduations of the screen being extended over a considerable portion of the field of view of the sighting telescope, means for rotating said telescope, a condensing lens system disposed at a suitable distance from said object, a screen connected to the lens system, the graduations of the latter screen being extended over a considerable portion of the field of view of the lens-system, the focal lengths of the telescope-objective and of the lens system being so related to their respective screens that the graduations of both screens correspond to each other, and a stationary bearer for the lens system and its screen.

10. In apparatus for directing an object irrespective of its position in combination a sighting telescope, an objective in the sighting telescope, a screen placed in the focal plane of said objective, the graduations of the screen being extended over a considerable portion of the field of view of the sighting telescope, means for rotating said telescope, a condensing lens system disposed at a suitable distance from said object, a screen connected to the lens system, the graduations of the latter screen being extended over a considerable portion of the field of view of the lens system, the focal length of the telescope-objective and of the lens system being so related to their respective screens that the graduations of both screens correspond to each other, a stationary bearer for the lens system and its screen, and means for rotating the lens system together with its screen on the bearer.

11. In apparatus for direction finding the combination with a gun, of a sighting telescope mounted thereon, an objective in the sighting telescope, a screen placed in the focal plane of said objective, means for rotating said telescope, a condensing lens system disposed at a suitable distance from said gun, a screen connected to the lens system, the graduations of the latter screen being extended over a considerable portion of the field of view of the lens system, the focal lengths of the telescope-objective and of the lens system being so related to their respective screens that the graduations of both screens correspond to each other, and a stationary bearer for the lens system and its screen.

12. In apparatus for direction finding the combination with a gun, of a sighting telescope mounted thereon, an objective in the sighting telescope, a screen placed in the focal plane of said objective, means for rotating said telescope, a condensing lens system disposed at a suitable distance from said gun, a screen connected to the lens system, the graduations of the latter screen being extended over a considerable portion of the field of view of the lens system, the focal lengths of the telescope-objective and of the lens system being so related to their respective screens that the graduations of both screens correspond to each other, a stationary bearer for the lens system and its screen, and means for rotating the stationary lens system together with its screen on the bearer.

13. In apparatus for direction finding the combination with a gun, of a sighting telescope mounted thereon, an objective in the sighting telescope, a screen placed in the focal plane of said objective, mean for rotating said telescope, a condensing lens system disposed at a suitable distance from said gun, a screen connected to the lens system, the graduations of the latter screen being extended over a considerable portion of the field of view of the lens system, the focal lengths of the telescope-objective and of the lens system being so related to their respective screens that the graduations of both screens correspond to each other, a stationary bearer for the lens system and its screen, means for rotating the lens system together with its screen on the bearer, and a sighting device connected to the said lens system.

14. In apparatus for direction finding, the combination with a gun, of a sighting telescope mounted thereon, an objective in the sighting telescope, a screen placed in the focal plane of said objective, the graduations of the screen being extended over a considerable portion of the field of view of the sighting telescope, the graduation markings being repeated several times along the lines, means for rotating the said telescope, a condensing lens system disposed at a suitable distance from said gun, a screen connected to the lens system, the graduations of the latter screen being extended over a considerable portion of the field of view of the lens system, its graduations markings being repeated several times along the lines, the focal lengths of the telescope-objective and of the lens system being so related to their respective screens that the graduations of both screens correspond to each other, a stationary bearer for the lens system and its screen, means for rotating the stationary lens system together with its screen on the bearer, a sighting device connected to the said lens system, and means for directing said gun.

RUDOLF STÜTZER.

In the presence of—
G. FLESCH,
IONE GIUSTI.